Dec. 8, 1964  J. WEISS  3,160,017
SWITCH CONTROLLING GOVERNOR
Filed Jan. 16, 1962  3 Sheets-Sheet 1
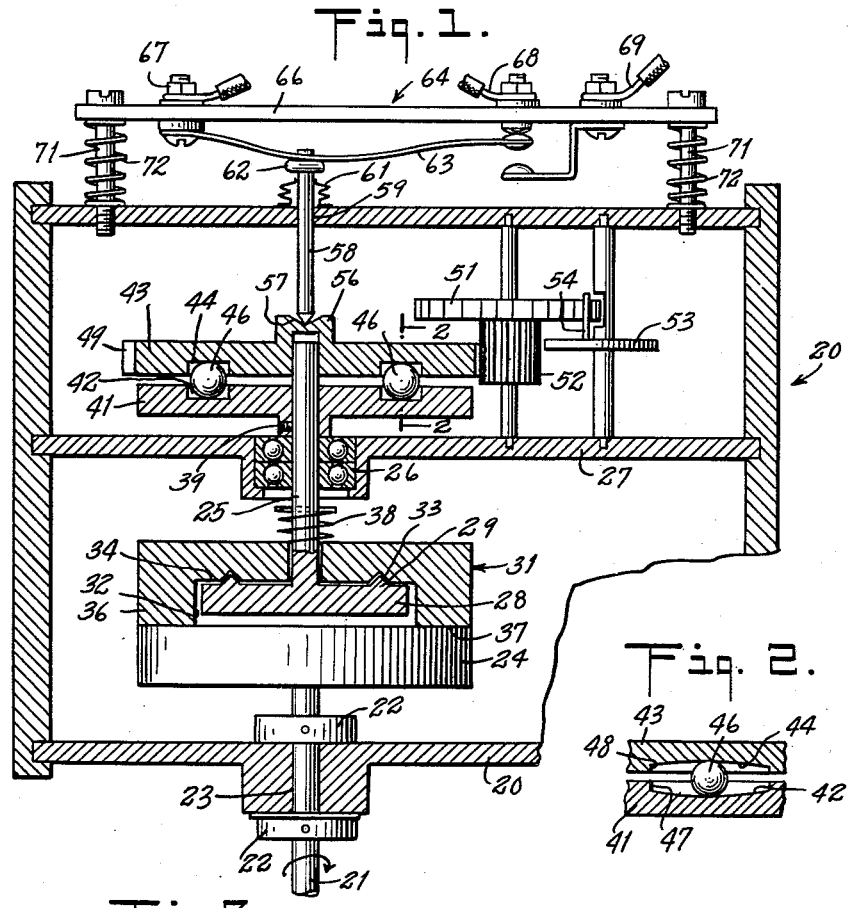
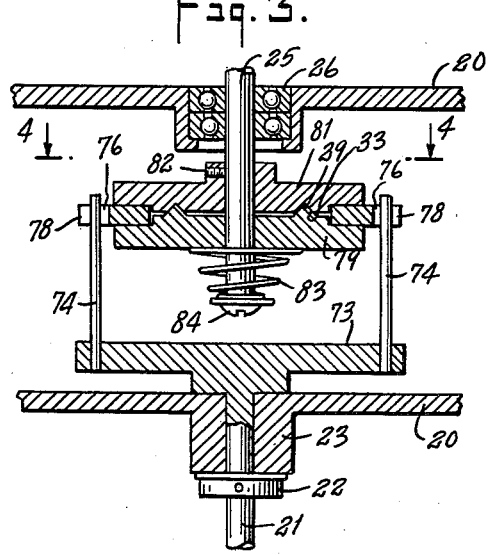
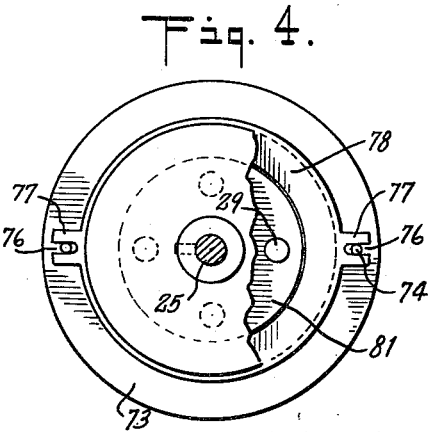
INVENTOR.
JOSEPH WEISS
BY Krazynski & Nolan
ATTORNEYS Dec. 8, 1964  J. WEISS  3,160,017
SWITCH CONTROLLING GOVERNOR
Filed Jan. 16, 1962  3 Sheets-Sheet 2
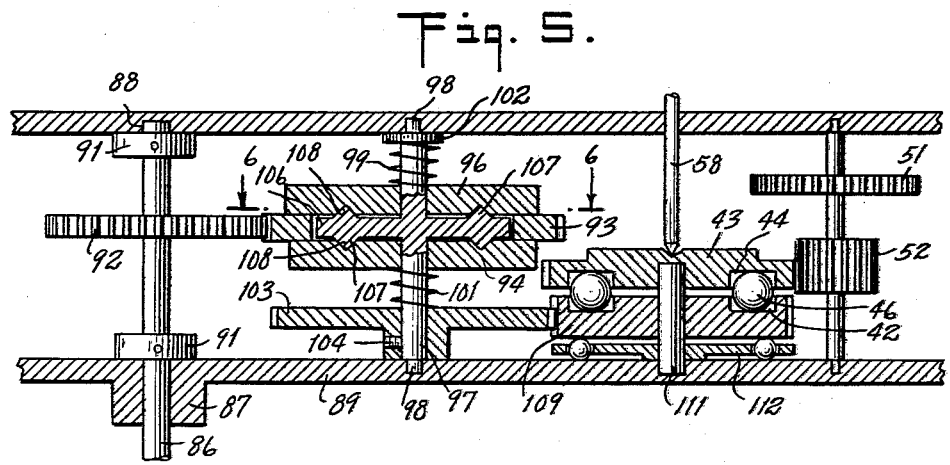
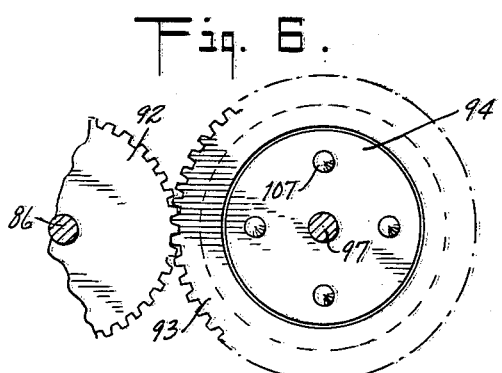
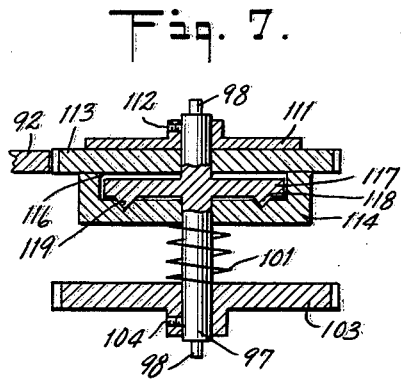
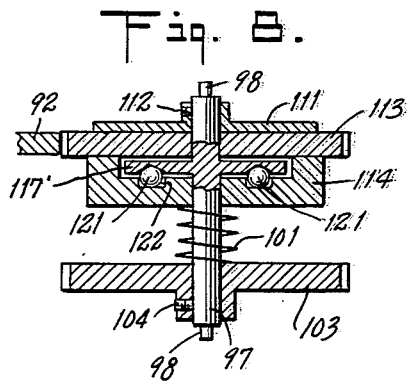
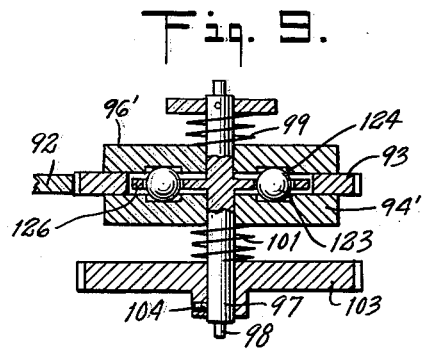
INVENTOR.
JOSEPH WEISS
BY Krazinski + Nolan
ATTORNEYS Dec. 8, 1964 J. WEISS 3,160,017
SWITCH CONTROLLING GOVERNOR
Filed Jan. 16, 1962 3 Sheets-Sheet 3
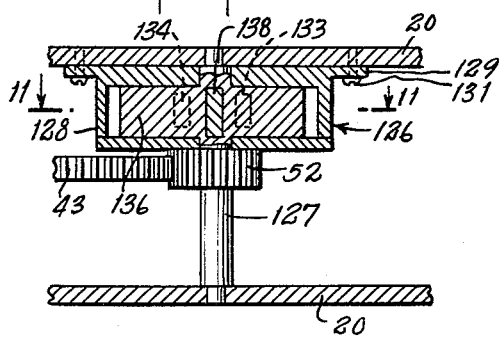
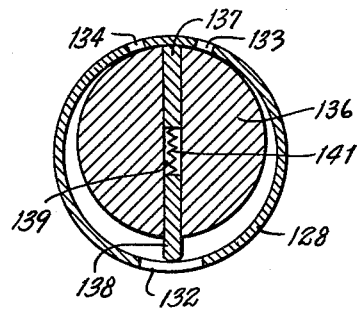
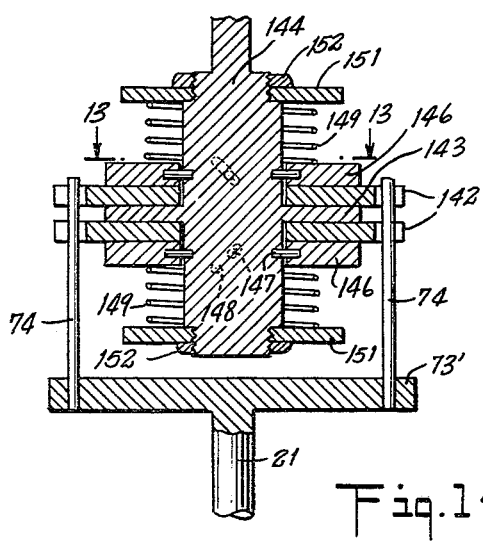
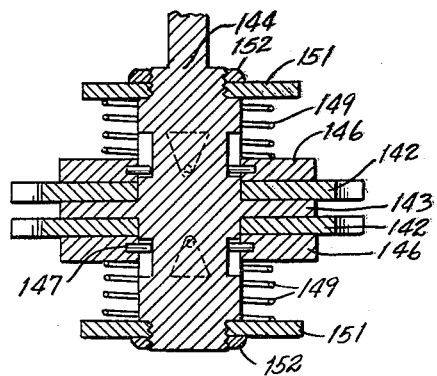
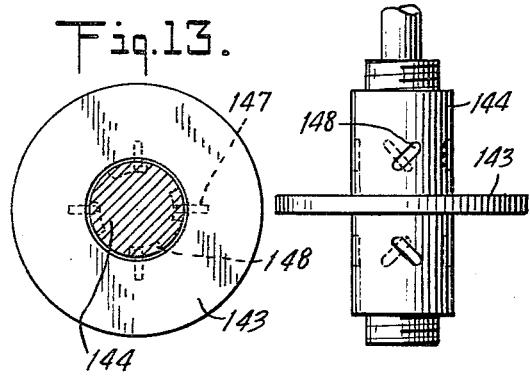
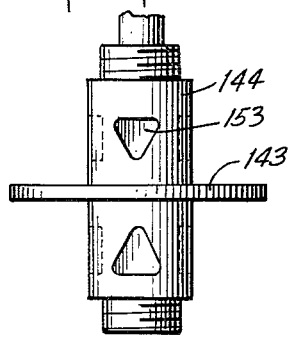
INVENTOR.
JOSEPH WEISS
BY Krazinski & Nolan
ATTORNEYS

United States Patent Office 3,160,017
Patented Dec. 8, 1964

3,160,017
SWITCH CONTROLLING GOVERNOR
Joseph Weiss, 134 W. 93rd St., New York 25, N.Y.
Filed Jan. 16, 1962, Ser. No. 166,638
9 Claims. (Cl. 73—507)

The present invention relates to governors and driving mechanism and, more particularly, to such governors which are an improvement over those shown in my prior United States Patent No. 2,603,731.

A primary object of the invention is to provide a drive that will overcome the difficulties encountered in the fixed friction slip type of drive which is continuously in full engagement with its driven part with the result that the component parts thereof wear rapidly, particularly when the respective speeds of the driving and driven elements vary greatly.

A feature of the present invention thus resides in overcoming the above difficulties by varying the force between the driving element and the driven element at the moment an overload occurs.

Other features will be apparent from the following detailed description of the drawings wherein:

FIG. 1 is a central, sectional view of a governor and drive mechanism in accordance with the present invention;

FIG. 2 is a fragmentary sectional view taken along line 2—2 of FIG. 1 in the direction of the arrows;

FIG. 3 is a fragmentary sectional view of a coupling portion of another embodiment of the invention;

FIG. 4 is a sectional view taken along line 4—4 of FIG. 3 in the direction of the arrows with a portion of the upper coupling removed;

FIG. 5 is a central, sectional view of a governor and drive mechanism in accordance with still another embodiment of the invention;

FIG. 6 is a sectional view taken along line 6—6 of FIG. 5 in the direction of the arrows;

FIGS. 7, 8 and 9 are fragmentary sectional views of other embodiments of couplings of the present invention;

FIG. 10 is a fragmentary sectional view of a vane type pump for use in place of the escapement shown in FIG. 1;

FIG. 11 is a sectional view taken along line 11—11 of FIG. 10 in the direction of the arrows;

FIG. 12 is a fragmentary sectional view of another embodiment of coupling of the present invention;

FIG. 13 is a sectional view taken along line 13—13 of FIG. 12 in the direction of the arrows;

FIG. 14 is a fragmentary elevational view of the shaft mechanism shown in FIG. 12;

FIG. 15 is a fragmentary sectional view of another embodiment of the coupling of the present invention; and FIG. 16 is a fragmentary elevational view of the shaft mechanism shown in FIG. 15.

Referring now to the drawings, particularly to FIGS. 1 and 2, there is shown one embodiment of a governor of my invention comprising a casing or housing 20 provided at its base with a shaft 21 which is driven from a suitable source (not shown) and which is provided with a pair of spaced flanges 22 straddling a bearing 23 for preventing longitudinal movement of the shaft. The flange 22 may be adjustable to compensate for frictional wear between it and the housing by providing set screws (not shown) instead of pins. To the inner end of the shaft 21 and spaced from the inner flange 22 is rigidly secured a disc, preferably a magnet 24 for rotation therewith.

Spaced above magnet 24, as seen in FIG. 1, and concentric with shaft 21 is shown a second shaft 25 which is rotatably supported by conventional anti-friction bearings 26, preferably double in number to provide greater stability by permitting free rotation of the shaft while at the same time preventing axial and/or side movement of the shaft. A cross member 27, secured to the housing 20, carries the bearings 26. To the lower end of the shaft 25 is rigidly secured a round disc or coupling 28 having a plurality of conically shaped projections 29 which function as cams, as will be described hereinafter. Loosely disposed around shaft 25 and supported upon disc 28 is shown a round coupling 31 which is provided with a downwardly facing counterbore 32 having a plurality of conically shaped recesses 33 on its undersurface 34, which recesses are complementary to and are adapted to mesh with the projections 29. Coupling 31 has a rim 36 with an undersurface 37 that is adapted to contact the upper surface of magnet 24 and to be rotated thereby. Coupling 31 is also adapted to be moved axially, as it is loosely mounted on shaft 25, and to assure its contact with the magnet 24 during normal operation a spring 38, rigidly secured at its upper end to shaft 25 and having its lower end engaging the upper surface of coupling 31, may be provided.

Above the cross member 27 is affixed to shaft 25, as by a set screw 39, a round disc 41 having on its upper surface a plurality of circumferentially spaced tapered cam recesses 42, as is more clearly evident in FIG. 2. Cooperating with cam disc 41 is another round disc 43 which is loosely mounted at the upper free end of shaft 25 and which is provided at its under surface with circumferentially spaced tapered cam recesses 44, complementary to cam recesses 42 of the lower cam disc 41. Interposed between the recesses 42 and 44 are shown balls 46 which are retained within the recesses by shoulders 47 and 48, respectively. Upper cam disc 43 is provided with peripheral teeth 49 for driving an escapement mechanism comprising a star wheel 51 driven by a pinion 52 in mesh with the teeth 49 of the upper cam disc 43, and a flutter wheel 53 carrying spaced pins 54 engaged by the star wheel 51. This escapement mechanism resists and retards rotation of the upper cam disc 43 in the conventional manner.

Upper cam disc 43 is also provided with a centrally disposed cap 56 having at its upper surface a tapered recess 57, concentric with shaft 25, for receiving the point of a pin 58 to reduce frictional resistance. The pin 58 is slidable in a bearing 59 formed in a top wall of the housing 20 and its upper end is encased in an insulating boot 61, accordion shaped, to engage a protuberance 62 on a blade spring 63, which is part of a switch assembly 64. This switch assembly comprises a non-conductive base plate 66, a terminal 67 disposed on the base plate having one end of the blade spring 63 electrically connected thereto, and a terminal 68 disposed on the base plate having a contact normally engaged by the free end of the blade spring 63. This blade spring is of the conventional and well-known over-center type spring employed in snap type electrical switches. When the upper cam disc 43 rises and applies an upward predetermined force to the pin 58, the blade spring 63 transfers from in contact with terminal 68 to in contact with terminal 69.

In order to adjust the force normally exerted by the spring 63 on pin 58 without opening the switch 64, the base plate 66 is slidably mounted on screws 71 threadedly secured in the top wall of the housing 20. A spring 72 coiled about each of the screws 71 urges the base plate 66 away from the housing top wall, so that the base plate pressure is set by the degree of penetration of the screws 71 into the housing top plate.

In operation, the torque load at the periphery of the upper disc 43 is set in relation to the angle of the cam recesses 42, 44 and to the resistance of the escapement mechanism, as well as to the amount of force exerted on the disc 43 by the blade spring 63. This is the torque load that can be transmitted to the escapment mechanism before the balls 46 reach the end of their travel in their opposing cam recesses 42, 44. These factors determine the speed at which cam disc 41 must rotate before the pin 58 will be raised to actuate the switch 64. Thus, if both discs 41 and 43 are rotated in synchronism, for example, at eight revolutions per minute (8 r.p.m.) of the shaft 25, the switch 64 remains inoperative and in its normal position shown in FIG. 1.

However, in the event the speed of the shaft 25 is increased the disc 41 tends to rotate faster than the upper disc 43 to thereby axially displace the balls 46, so that as the balls roll along the tapered surfaces of the recesses 42, 44 towards the shoulders 47 and 48, respectively, the upper disc 43 and, in turn, the pin 58 is raised to actuate blade spring 63 and operate switch 64. When the rotation of the disc 41 falls below the speed of rotation for which the upper disc 43 is set, the balls 46 return to the low points of their respective recesses 42, 44 and thereby permit reclosure of the switch 64.

Should the torque load, as measured at the periphery of disc 43 exceed its permissible maximum, for example, one inch ounce torque, slip will occur between the driving magnet 24 and the driven coupling 31 and thus maintain the torque load at the periphery of disc 43 within the predetermined limit. During operation of the mechanism, when such overload occurs, the retarding force at the periphery of disc 43 is transmitted back to coupling 31 through the conically shaped cam projections 29 and corresponding cam recesses 33, which causes the coupling 31 to be displaced away from the driving magnet 24. There is thus produced a slip between magnet 24 and coupling 31, whereby only sufficient magnetic attraction and frictional contact therebetween is permitted to transmit the predetermined amount of torque load.

Should the torque load drop to a point below its predetermined maximum amount, the attraction of magnet 24 will overcome the now weakened disengaging force acting on coupling 31 through the cam projections 29 and recesses 33 and permit the coupling to be returned to its former position of full frictional engagement with magnet 24. Both magnet 24 and coupling 31 are then in full magnetic and frictional contact.

The torque load that can be transmitted from driving magnet 24 through coupling 31 to shaft 25 and thence through disc 41 to disc 43 is determined by many factors, among which are:

(1) The amount of contact surface area between disc 24 and the rims 36 of coupling 31;
(2) The coefficients of the material constituting the surface areas of rims 36 of coupling 31 and disc 24;
(3) The force acting on the coupling 31 to engage it with the disc 24;
(4) The angle and shape of the cam projections 29; and
(5) The angle and shape of the cam recesses 33.

For example, the transmitted torque may be increased or decreased merely by increasing or decreasing the magnetic forces acting on coupling 31 or by changing the angle of the conical recesses 33. The amount of axial displacement of coupling 31 away from magnet 24 need only be sufficient to reduce the contact therebetween to allow for wear and some end play. The total amount, for example, of axial movement between cam recesses 33 of coupling 31 and cam projections 29 of coupling 28 is 0.065", with magnet 24 and coupling 31 in full engagement with each other, while the apex of each projection 29 is set so that each is, for example, 0.015" from the apex of each cam recess 33. This allows for 0.015" end play or wear between the magnet 24 and coupling 31.

In FIGS. 3 and 4 is shown a modified coupling arrangement wherein shaft 21 is provided with a rigidly secured driving member 73 having the lower ends of a pair of upstanding pins 74 rigidly disposed around its periphery and the upper ends thereof loosely disposed in slots 76 of ears 77 on an annulus or ring 78. The inner peripheral surface areas of ring 78 are sandwiched between the outer peripheral surface areas of couplings 79 and 81 which are carried by shaft 25, upper coupling 81 being rigidly secured to the shaft 25 by a set screw 82. The couplings, as in FIG. 1, are provided with meshed, tapered cams 29 and recesses 31 and coupling 79 is urged against coupling 81 by means of a spring 83, the force of which is adjustable through a screw 84. It is evident that the rotation of shaft 21 is transmitted to shaft 25 through driving member 73, pins 74, ring 78 and couplings 79, 81. When an overload occurs, coupling 79 is axially displaced away from coupling 81 and this decreases the frictional contact of ring 78 with couplings 79, 81.

In FIGS. 5 and 6 is shown a further modification of FIG. 1. In this embodiment a driving shaft 86 rotatable in bearings 87, 88 in the bottom and top walls, respectively, of a housing 89 and having flanges 91 above the bottom wall and below the top wall of the housing 89 rotates a gear 92 which is rigidly affixed thereto and which is disposed between the flanges. The gear 92 meshes with a ring gear 93 which is sandwiched between two couplings 94, 96 loosely mounted upon a shaft 97 having reduced ends 98 journalled in the bottom and top walls of the housing 89. Both couplings 94, 96 are urged against the ring gear 93 by opposing springs 99 and 101, one end of spring 99 bearing against a collar 102 rigidly secured to shaft 97 and the other end of spring 99 bearing against the coupling, while one end of spring 101 bears against the lower coupling 94 and the other end of spring 102 bears against a gear 103 rigidly secured to shaft 97 by a set screw 104. Gear 103 can be utilized to vary the pressure of spring 101 by sliding gear 103 on shaft 97. The pressure of spring 99 can also be adjusted by making collar 102 adjustable on shaft 97.

Interposed between couplings 94, 96 and in the same plane with ring gear 93 is shown a cam member 106 having conical cam projections 107 on both the upper and lower sides thereof, which projections mesh with corresponding conical recesses 108 in the abutting faces of the couplings 94 and 96. Rotary motion is thus transmitted from shaft 86 to shaft 97 similarly to that described for FIG. 3 and this motion is then passed by gear 103 to a gear 109 which is loosely mounted upon a stationary post 110 carried by the bottom wall of housing 89. A thrust bearing 110' supports the gear 109 which in turn supports a cam disc 43 through balls 46 disposed in complementary cam recesses 42 and 44, as in FIG. 1. The operation of the governor through the escapement mechanism is the same as that described in connection with FIG. 1.

In FIGS. 7, 8 and 9 are shown other embodiments of the control mechanism shown in FIG. 5 and, referring first to FIG. 7, the shaft 97 has adjacent its upper end a round disc 111 rigidly secured thereto by a set screw 112, a gear 113 loosely mounted therein and directly below disc 111 which is in frictional engagement therewith, gear 113 being in mesh engagement with gear 92, and a round coupling 114 having an upwardly facing counterbore 116 also loosely mounted thereon. A round coupling 117 having downwardly facing conical projections 118, and within the counterbore 116, is rigidly secured to shaft 97 and, as in FIG. 1, these projections 118 mesh with corresponding conical recesses 119 in the coupling 114. Spring 101 urges coupling 114 against gear 113 and the latter in turn against disc 111, the operation thereof being the same as that described for FIG. 5.

FIG. 8 is similar to FIG. 7, except that, instead of the conical cams and recesses, balls 121 are disposed in circumferentially tapered cam recesses 122 in coupling 117'. The control mechanism of FIG. 9 is similar to that shown in FIG. 5 wherein the conical cams and recesses thereof are replaced by balls 123 and circumferentially tapered recesses 124 in couplings 94' and 96', the balls 123 being retained by a disc 126 that is rigidly secured to shaft 97.

The control mechanisms shown in FIGS. 5 and 9 can be rearranged to have gear 103 in mesh with and driven by gear 92, and gear 93 in mesh with and driving gear 109. Likewise in FIGS. 7 and 8 the gear 103 can be meshed with gear 92 to be driven thereby and gear 113 meshed with gear 109 to drive the latter.

Referring now to FIGS. 10 and 11, there is shown a vane or rotary type pump 126 in place of the escapement mechanism shown in FIG. 1. In this embodiment the pinion 52, which is driven by gear 43 and which is rigidly secured to shaft 127, rotates the vane pump 126, which comprises a casing 128 having flanges 129 that are secured to the top wall of the housing 20 by screws 131. The pump casing 128, as is seen in FIG. 11, has an inlet opening 132 and two outlet openings 133 and 134 and has within it a rotor 136 and a pair of aligned rotor blades 137, 138 loosely disposed in a slot 139 in the rotor, which blades are spaced apart and urged outwardly by a spring 141 to contact the side wall of the casing 128. In operation, the blades 137, 138 rotate with the rotor 136 drawing in fluid through inlet opening 132 and exhausting the fluid through either outlet opening 133 or 134, depending upon the direction of rotation of the rotor 136. Thus the pump 126 is used as a control means for obtaining a predetermined rotation of speed of the means driving it. The slower the rotation of the rotor the lesser the resistance. As the speed of rotation increases, the torque required to drive it increases accordingly. Consequently, the pump can be set so that a predetermined amount of torque resistance will occur at a predetermined speed of rotation of the pump rotor.

Still another embodiment of controlled drive mechanism is shown in FIGS. 12, 13 and 14. In this embodiment two driving elements 142 are used, instead of the one driving element 78, shown in FIG. 3. Coupling 143 is rigidly secured to shaft 144 and it is sandwiched between the two driving elements 142 which are loosely carried by the shaft 144 and which in turn are sandwiched between two discs 146 each having a projection 147 freely movable in a helical groove 148 provided in the shaft 144. Each disc 146 is urged against its associated driving element 142 by a spring 149, the compressive force of which is varied by a spacer 151 abutting each spring and a nut 152 threadedly mounted upon the shaft 144, as is readily evident in FIG. 12. The doubling of the driving element and associated disc of the embodiment of FIG. 3 is to provide in this embodiment more surface coupling area for transmitting greater torque than is possible in the previous embodiments. Obviously, each of the previous embodiments shown herein may be modified to provide such multiplication of driving elements and associated discs for transmitting greater amounts of torque. Also, the operation of this embodiment is similar to that shown in FIG. 3.

The embodiment of FIGS. 15 and 16 is substantially the same, and its operation as well, as that of FIGS. 11-13 except that, instead of spaced helical grooves, spaced triangular grooves 153 are provided in the shaft 144 for the pins 147, which have greater latitude of movement because of the larger triangular recess.

From the foregoing description, it will be seen that the present invention provides a governor of the type indicated herein which is accurate and reliable and functions in response to relatively small changes of forces and is capable of transmitting substantial torques to mechanism controlled thereby. Also, the present governor can overspeed without damage to moving parts and thereby enable it to be employed in positive or direct drives.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A governor for controlling a movable element of a device comprising, in combination, a first rotatable member, a second rotatable member variably responsive to said first member and adapted for axial movement to and from said first member, a third rotatable member in engagement with said second member, complementary means on said second and third members for controlling transmission of torque from said first member to said second member, whereby said second member is axially movable with respect to said first member to cause slip therebetween when the torque transmitted exceeds a predetermined amount, means associated with said third member for limiting the speed of rotation of said third member, and variable means interposed between said third member and siad speed limiting means for actuating said movable element upon said variable means reaching a predetermined speed of rotation.

2. A governor in accordance with claim 1, wherein said variable means is constituted by a pair of opposing discs having complementary cam surfaces.

3. A governor in accordance with claim 2, wherein the complementary cam surfaces are constituted by balls and recesses.

4. A governor in accordance with claim 1, wherein said first, second and third members are each constituted by a single element, said first member being a ring-shaped element frictionally disposed between said second and third members.

5. A governor in accordance with claim 1, wherein said second member is constituted by a pair of discs.

6. A governor in accordance with claim 1, wherein said second member is constituted by a single movable disc and said third member is constituted by a pair of discs, in which one of said pair of discs is frictionally engageable with said first member.

7. A governor in accordance with claim 1, wherein said first member is constituted by a pair of spaced discs, said third member is constituted by a single disc disposed between said spaced discs and adapted to engage inner surfaces of said spaced discs, and said second member is constituted by a pair of spaced discs frictionally engageable with outer surfaces of said spaced discs.

8. In a governor for controlling a movable element, a first rotatable member, a second rotatable member variably responsive to said first member and adapted for axial movement to and from said first member, a third rotatable member in engagement with said second member for controlling said movable element, and complementary means including conical projections and recesses on said second and third members for controlling transmission of torque from said first member to said second member, whereby said second member is axially movable with respect to said first member to cause slip therebetween when the torque transmitted exceeds a predetermined amount.

9. In a governor in accordance with claim 8, wherein the complementary means are constituted by balls and recesses on the respective members.

References Cited by the Examiner

UNITED STATES PATENTS

| | | | |
|---|---|---|---|
| 1,936,566 | 11/33 | Davenport | 73—507 X |
| 2,215,722 | 9/40 | Hurst | 73—527 X |
| 2,603,731 | 7/52 | Weiss et al. | 73—507 X |
| 2,704,157 | 3/55 | Hertrich | 73—527 X |
| 2,761,669 | 9/56 | Hamill | 73—507 |
| 2,802,913 | 8/57 | Weiss | 73—507 X |

RICHARD C. QUEISSER, *Primary Examiner.*

S. LEVINE, *Examiner.*